June 5, 1934.  C. D. FISHER  1,961,965
FRUIT TESTING APPARATUS
Filed Jan. 23, 1933  2 Sheets-Sheet 1
FIG_1_
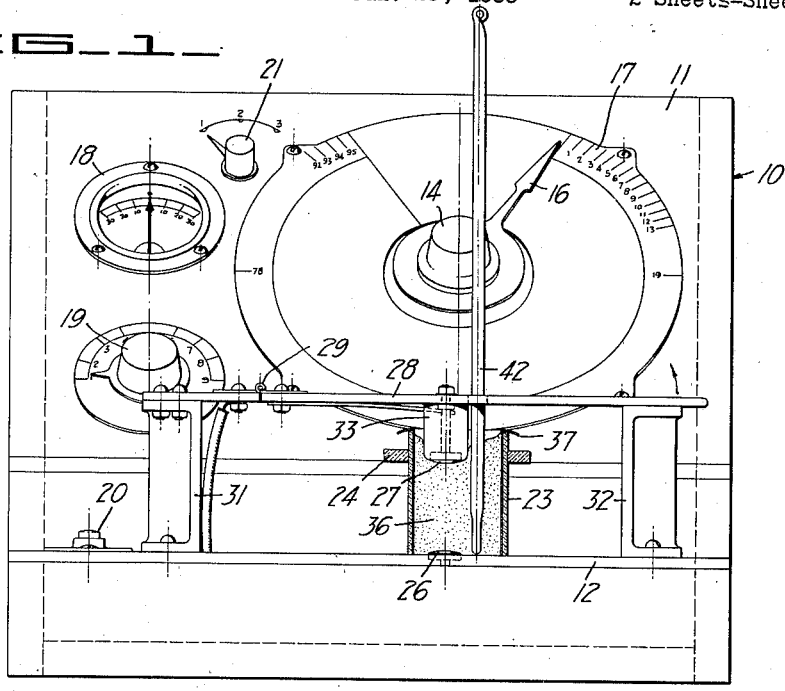
FIG_2_  FIG_3_
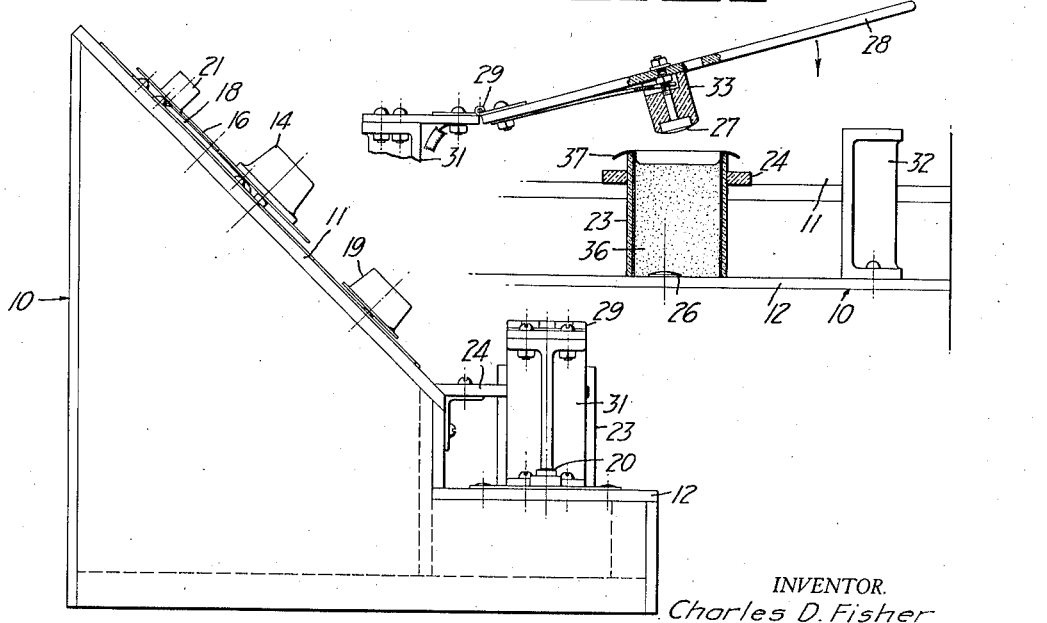
INVENTOR.
Charles D. Fisher
BY
White, Prost, Fuller & Lothrop
ATTORNEYS.

June 5, 1934.  C. D. FISHER  1,961,965
FRUIT TESTING APPARATUS
Filed Jan. 23, 1933   2 Sheets-Sheet 2
FIG_4_
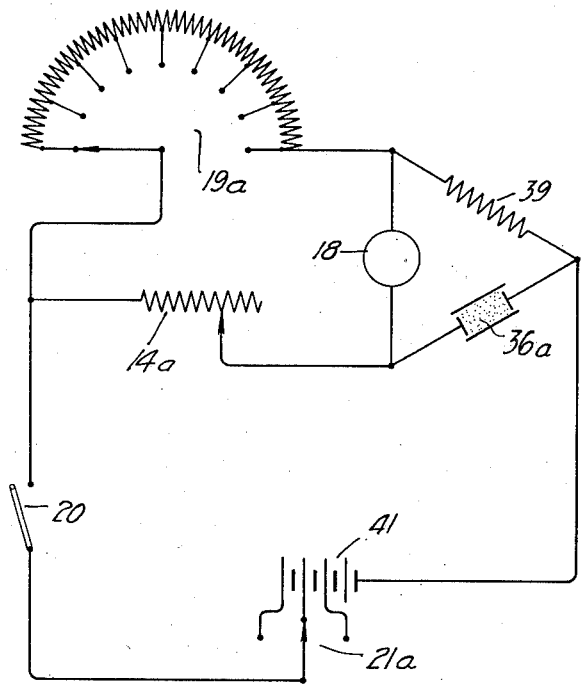
INVENTOR.
Charles D. Fisher
BY
White, Prost, Fehr & Lothrop
ATTORNEYS.

Patented June 5, 1934

1,961,965

UNITED STATES PATENT OFFICE 1,961,965

FRUIT TESTING APPARATUS

Charles D. Fisher, Fresno, Calif., assignor to Dried Fruit Association of California, San Francisco, Calif., a corporation of California Application January 23, 1933, Serial No. 652,974

4 Claims. (Cl. 175—183)

This application relates generally to apparatus for determining moisture content of various edibles, particularly those handled by the dried fruit industry such as prunes, raisins, dried apricots, figs, dates, walnuts, and the like.

It is an object of the invention to provide apparatus of the above character which will be relatively simple in construction, and which can be manipulated without difficulty to secure accurate measurement of moisture content.

A further object of the invention is to provide a relatively wide latitude of flexibility and adjustment, so that the same apparatus can be used for testing a variety of edibles, and for covering a wide range of moisture content.

Another object of the invention is to provide a method of testing to determine moisture content which will take into account the fact that electrical conductivity of the fruit and like material varies with changes in temperature.

Further objects of the invention will appear from the following description in which the preferred embodiment of the invention has been set forth in detail in conjunction with the accompanying drawings.

Referring to the drawings:

Figure 1 is a front elevational view, illustrating apparatus incorporating the present invention.

Fig. 2 is a side elevational view of the apparatus shown in Fig. 1.

Fig. 3 is a detail illustrating the manner in which the electrical connections are made to the charge of material being tested.

Fig. 4 is a circuit diagram illustrating the manner in which the electrical parts of the apparatus are connected.

Referring to the drawings, the apparatus as illustrated consists of a box or housing 10, which serves to enclose the electrical parts of the apparatus, and which can be so formed as to afford an instrument panel 11. The front of this housing is shown provided with a shelf 12 for supporting certain parts in a convenient position to be manipulated by the operator. Supported upon the instrument panel 11, there is an operating knob 14 of an electrical rheostat, the pointer 16 of which operates over a graduated scale 17. Likewise mounted upon this panel, there is a galvanometer 18 or equivalent form of sensitive current indicating device, knobs 19 and 21 which serve to control multipole electrical switches, and a push button or equivalent form of switch 20. It may be explained at this point that by turning knob 19 the operator adjusts the apparatus in accordance with the type of material being tested, while the adjustment of knob 21 makes possible proper sensitivity over a relatively wide latitude of moisture content.

Although suitable electrical current connections will be presently described with reference to Fig. 4, it may be stated at this time that a Wheatstone bridge type of circuit is employed, and that in making a test the current flow thru a sample of predetermined dimensions, and between two electrodes maintained at a fixed predetermined distance apart, is employed as an index to moisture content. The charge of material to be tested is preferably retained within an open-ended cartridge 23, made of a suitable insulating material, and which is preferably cylindrical and of predetermined dimensions. This cartridge is loosely retained by bracket 24, and is adapted to rest upon the shelf 12. Mounted upon the shelf 12, and within the area encompassed by the lower open end of cartridge 23, there is a button shaped electrode 26.

The second electrode 27 is adapted to make contact with the upper end of the charge of material placed in cartridge 23, and is shown mounted upon a lever 28. One end of this lever 28 has a hinge connection 29 with an upright standard 31, which in turn is mounted upon shelf 12. The free end of lever 28 is adapted to rest upon a standard 32, which in effect forms a stop to limit downward movement. Electrode 27 is surrounded by a member or sleeve 33 of insulating material, which may be cylindrical in shape, and which is preferably of substantially smaller diameter than the internal diameter of the upper end of cartridge 23. It will be noted that the lower face of electrode 27 is convex, and is contiguous with the lower convex end face of member 33.

In Figs. 1 and 3 a charge 36 of material to be tested has been shown positioned within the cartridge 23. Preferably this charge is made up by grinding a mass of the edible to be tested, and by introducing this mass into the cartridge 23 with sufficient application of pressure to avoid the presence of air pockets. To facilitate removal of the charge after a test, the cartridge is preferably provided with a liner 37 made of wax paper or cellophane. At the time the charge to be tested is introduced into cartridge 23, this cartridge rests upon shelf 12, so that the lower end of the charge makes contact with the upper surface of electrode 26. Likewise at this time lever 28 is swung back to an out of the way position. After the cartridge has been substantially filled, lever 28 is now swung down toward the cartridge, and pressed down into contact with standard 32. During the last part of the movement of lever 28, electrode 27, and likewise the insulation 33, is caused to penetrate the upper end portion of the charge, with a slight wiping movement due to the hinging of lever 28. This wiping movement serves to promote effective contact with the lower surface of electrode 27. Penetration of electrode 27 together with its associated insulation, into the upper portion of the charge, causes a certain amount of the charge to be displaced upwardly, so that the pressure upon the charge in the space between the electrodes is not greater than atmospheric.

Before explaining further manipulation of the apparatus to secure an indication of the moisture content of the charge, it will be necessary to refer to the circuit diagram of Fig. 4. This diagram illustrates a Wheatstone bridge, in which 14a represents the variable resistance controlled by knob 14; 18 represents the galvanometer illustrated in Fig. 1; 19a represents the adjustable resistance controlled by knob 19; 36a represents the charge of material to be tested, together with the associated electrodes; and 39 represents a fixed resistance forming one branch of the bridge. Switch 21a corresponding to switch knob 21, for controlling the potential supplied from battery 41, while switch 20 opens and closes the battery circuit to the bridge. Assuming a given setting for adjustable resistance 19a the battery switch 21a, and a given resistance for the charge being tested, it is evident that by adjusting the variable resistance 14a, the bridge can be so balanced that no current flow occurs thru the galvanometer 18. It has been found that the conductivity of the charge of fruit or other edible material as indicated in this manner, bears a direct relationship to moisture content. It has been further found, however, that conductivity of such material varies considerably with the temperature of the charge, therefore before the results of the test can be accurately translated in terms of moisture content, the temperature of the charge must be known and taken into account. It is for this reason that in Fig. 1, I have shown a thermometer 42 inserted in the charge being tested, so that the temperature can be noted while the test is in progress.

Before the apparatus can be utilized in practice to make rapid tests which can be immediately translated into terms of moisture content, it is necessary to prepare a set of calibration charts, from which, knowing the type of material being tested, the temperature of the samples, the setting of adjustable resistance 19a and battery switch 21a, and the setting of resistance 14a to secure zero indication of the galvanometer, it is possible to immediately determine the moisture content of the charge. Different types of fruit will of course have different calibration curves, because of the varying conductivity of different fruit juices.

Operation of the apparatus as a whole can now be briefly reviewed. The operator places a charge of material to be tested into cartridge 23, and then swings lever 28 down upon the standard 32, to cause the charge to be penetrated by electrode 27. After placing thermometer 42 into the charge, the operator then sets knob 19 in accordance with the type of material being tested, switch 20 is closed and knob 14 is adjusted until the indication of galvanometer 18 is zero. In the event the galvanometer is not sufficiently sensitive in its response, the setting of knob 21 is varied until proper sensitivity is secured. The operator then notes the indication of pointer 16, the setting of knobs 19 and 21, and the temperature of the charge. By referring to a proper calibration curve, the data thus secured is immediately translated into terms of moisture content.

I claim:

1. In apparatus for determining moisture content of edible materials like dried fruits by electrical conductivity, a cartridge adapted to retain a charge of material, an electrode adapted to contact with said charge at one end of the cartridge, the other end of said cartridge being open, a member formed of insulating material having a diameter substantially less than the internal diameter of the open end of said cartridge, means for mounting said member for a swinging movement into and out of said cartridge, and an electrode carried within said member and adapted to make contact with the other end of said charge.

2. In apparatus for determining moisture content of edible materials like dried fruits by electrical conductivity, an open-ended cartridge adapted to retain a charge of material, a support upon which one end of said cartridge may removably rest, an electrode carried by said support for making contact with the lower end of said charge, a lever pivotally secured to said support for swinging movement in a vertical plane toward and away from the upper end of said cartridge, an electrode carried by said lever adapted to enter the upper end of the cartridge when said lever is swung downwardly, and a stop for limiting downward movement of said lever whereby a predetermined distance is established between the electrodes.

3. In apparatus for determining the moisture content of edible materials like dried fruits by electrical conductivity, an open-ended cartridge adapted to retain a charge of material, a support upon which the lower open end of the cartridge may removably rest, an electrode carried by said support for making contact with the lower end of said charge, a lever pivotally secured to said support for swinging movement in a vertical plane toward or away from the upper end of said cartridge, a member of insulating material carried by said lever and having a diameter substantially less than the internal diameter of the upper open end of the cartridge, whereby said member may enter the upper end of the cartridge when said lever is swung downwardly, means for limiting downward swinging movement of said lever, and an electrode carried within said insulating member, the lower face of said electrode being contiguous with the lower face of said insulating member and being exposed for contact with said charges.

4. In apparatus for determining moisture content of edible materials like dried fruits, a cartridge adapted to retain a charge of the material to be tested, an electrode adapted to make contact with the charge at one end of the cartridge, the other end of the cartridge being open, a member of insulating material having a diameter substantially less than the internal diameter of the open end of said cartridge, means for movably mounting said member whereby the same may be moved into and out of said cartridge, an electrode disposed within said member and adapted to make contact with the other end of said charge, and a stop for limiting movement of said member inwardly of the cartridge whereby a predetermined distance is established between the electrodes.

CHARLES D. FISHER.